F. E. BENSON.
GRASSHOPPER CATCHER.

No. 184,223. Patented Nov. 14, 1876.

WITNESSES.

INVENTOR.
Finley E. Benson.
Per F. A. Lehmann.
Atty.

UNITED STATES PATENT OFFICE.

FINLEY E. BENSON, OF WALNUT, IOWA.

IMPROVEMENT IN GRASSHOPPER-CATCHERS.

Specification forming part of Letters Patent No. 184,223, dated November 14, 1876; application filed October 14, 1876.

*To all whom it may concern:*

Be it known that I, F. E. BENSON, of Walnut, in the county of Pottawattamie and State of Iowa, have invented certain new and useful Improvements in Grasshopper-Catchers; and I do hereby declare the following to be a full, clear, and exact description of the invention, such as will enable others skilled in the art to which it pertains to make and use it, reference being had to the accompanying drawings, which form part of this specification.

My invention relates to an improvement in grasshopper-catchers; and it consists in the arrangement and combination of parts that will be more fully described hereinafter, whereby the insects can be rapidly caught, and then scalded to death.

Figure 1:
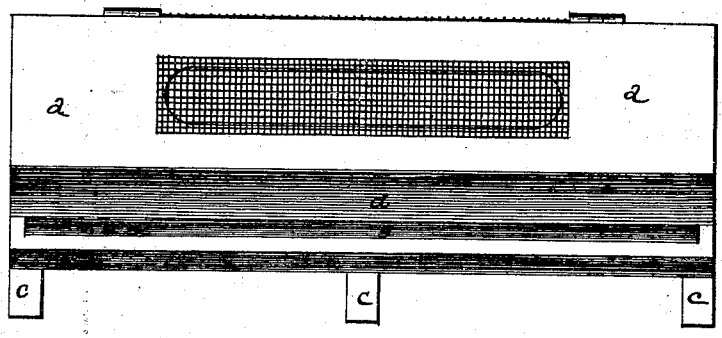
Figure 2:
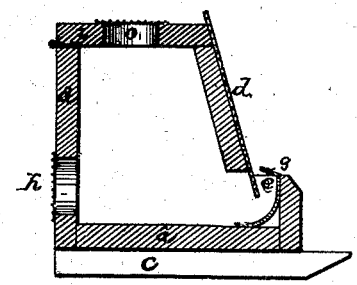

Figure 1 is a plan view of my invention. Fig. 2 is a vertical section of the same.

$a$ represents a long, narrow box or cage, which may either run upon the runners $c$ or small wheels, as preferred. A portion of the front of this box is removed, as shown, and the inclined side covered with a sheet of tin, or other suitable substance, $d$, upon which the insects light, and then slide down, through the slit $e$, into the box. In order to prevent them from hopping out again, a guard, $g$, is made to extend horizontally over this opening in the front of the box, toward the inclined surface $d$, leaving just enough space between them to let the insects in, but not out again. In the rear side of the box $a$ is made a light or long opening, $h$, which is covered over with wire-gauze, so as to light the interior of the box, and thus cause the insects to fly toward it, away from the slit. The top of the box is provided with a hinged cover, $i$, through which is made a similar light, $o$, for the same purpose, and so that hot water or steam can be forced into the box to kill all the insects caught.

The box is drawn or forced forward over the ground, and, as the insects light on the incline $d$, the motion of the machine shakes them down into the box through the slit $e$, where they are killed, and then emptied out through the cover.

Having thus described my invention, I claim—

A grasshopper-catcher, consisting of the box $a$, inclined surface $d$, slit $e$, guard $g$, and openings $h$ $o$, substantially as shown, and for the purpose specified.

In testimony that I claim the foregoing I have hereunto set my hand this 27th day of September, 1876.

FINLEY E. BENSON.

Witnesses:
LEANDER SOUGE,
W. H. BOWMAN.